(12) United States Patent
Yi et al.

(10) Patent No.: US 11,928,220 B2
(45) Date of Patent: Mar. 12, 2024

(54) METHOD FOR EVALUATING RISK OF DATA LEAKAGE IN APPLICATION, RECORDING MEDIUM AND DEVICE FOR PERFORMING THE METHOD

(71) Applicant: Foundation of Soongsil University-Industry Cooperation, Seoul (KR)

(72) Inventors: Jeong Hyun Yi, Seoul (KR); Minseong Choi, Seoul (KR); Sunjun Lee, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 394 days.

(21) Appl. No.: 17/420,036

(22) PCT Filed: Apr. 1, 2021

(86) PCT No.: PCT/KR2021/004034
§ 371 (c)(1),
(2) Date: Jun. 30, 2021

(87) PCT Pub. No.: WO2022/163908
PCT Pub. Date: Aug. 4, 2022

(65) Prior Publication Data
US 2022/0245259 A1 Aug. 4, 2022

(30) Foreign Application Priority Data
Jan. 29, 2021 (KR) .................. 10-2021-0013283

(51) Int. Cl.
G06F 7/04 (2006.01)
G06F 21/57 (2013.01)
H04N 7/16 (2011.01)

(52) U.S. Cl.
CPC ...... *G06F 21/577* (2013.01); *G06F 2221/033* (2013.01)

(58) Field of Classification Search
CPC .................................................. G06F 21/577
(Continued)

(56) References Cited

U.S. PATENT DOCUMENTS

2018/0307837 A1* 10/2018 Ahn ................ G06F 21/6218
2021/0374293 A1* 12/2021 Bartling ............... G06F 3/0679

FOREIGN PATENT DOCUMENTS

KR  10-1623096 B1  5/2016
KR  10-1666176 B1  10/2016
(Continued)

*Primary Examiner* — Jeffrey C Pwu
*Assistant Examiner* — Samuel Ambaye
(74) *Attorney, Agent, or Firm* — Stein IP, LLC

(57) ABSTRACT

A method for evaluating the risk of data leakage in an application includes the steps of: extracting a DEX (Dalvik Executable) file and a so (Shared Object) file by decompressing an APK file of a mobile application; extracting DEX code information from the DEX file by parsing the DEX file; translating a content of the so file into IR (Intermediate Representation); extracting IR code information from the translated IR; generating a call-reference structure between the DEX file and the so file by processing the extracted DEX code information and the extracted IR code information; and outputting weakness information according to a risk designated in advance based on the generated call-reference structure. Accordingly, it is possible to extend the call-reference coverage of an android application.

10 Claims, 8 Drawing Sheets

(58) Field of Classification Search
USPC .......................................................... 726/26
See application file for complete search history.

(56) References Cited

FOREIGN PATENT DOCUMENTS

| | | |
|---|---|---|
| KR | 10-2018-0060497 A | 6/2018 |
| KR | 10-1872104 B1 | 6/2018 |
| KR | 10-1875866 B1 | 7/2018 |
| KR | 10-1920597 B1 | 11/2018 |
| KR | 10-1926142 B1 | 12/2018 |
| KR | 10-2020-0060180 A | 5/2020 |

* cited by examiner

FIG. 2

```
OrderedDict([
  ( 'className', 'LAAa;' ),
  ( 'methodName', '<init>' ),
  ( 'returnType', 'void' ),
  ( 'registers', OrderedDict([( 'begin', 0 ), ( 'size', 1 )])),
  ( 'paramList', [( 1, 'yAa' )]),
  ( 'accessFlagList', [ 'public', 'constructor' ]),
  ( 'methodIndex', 1 ),
  ( 'codeSize', 6 ),
  ( 'instructions',
        [OrderedDict([( 'bytecode', '7010808b0000' ),
            ( 'smali', 'invoke-directv0, Ljava/lang/Object;-><init>()V' )]),
        OrderedDict([( 'bytecode', '5b011700' ),
            ( 'smali', 'iput-objectv1, v0, LAAa;->ESbLyAa;' )]),
        OrderedDict([( 'bytecode', '0e00' ),
            ( 'smali', 'return-void' )]
        )]
  )
  ( 'javaSource',
        [
            'v0 = new LAAa()' ,
            'return void'
        ]
  )
])
```

FIG. 3

```
[OrderedDict([
  ( 'functionName', '@main' ),
  ( 'returnType', 'i32' ),
  ( 'paramList',
        OrderedDict([( '1', [ 'void (i64*)*', 'func' ]),
            ( '2', [ 'i64*', 'arg' ]),
            ( '3', [ 'i64*', 'dso_handle' ])
    ])
  ),
  ( 'functionIndex', 2 ),
  ( 'codeSize', 10 ),
  ( 'IRCodes',
        OrderedDict([( '1', '%1 = alloca i32, align 4' ),
            ( '2', '%2 = alloca i32, align 4' ),
            ( '3', 'store i32 0, i32* %1, align 4' ),
            ( '4', 'store i32 1, i32* %2, align 4' ),
            ( '5', '%3 = load i32, i32* %2, align 4' ),
            ( '6', '%4 = add nsw i32 %3, 1' ),
            ( '7', 'store i32 %4, i32* %2, align 4'),
            ( '8', '%5 = load i32, i32* %2, align 4' ),
            ( '9', '%6 = call i32 (i8*, ...) @printf(i8* getelementptr inbounds ([8 x i8], [8 x i8]* @.str, i64 0, i64 0), i32 %5)' ),
            ( '10', 'ret i32 0' )
    ])
  )
])
]
```

FIG. 4

```
[
  OrderedDict([
    ( 'caller', '@function_7e0' ), ( 'callee', '@__cxa_finalize' )
  ]),
  OrderedDict([
    ( 'caller', '@function_7f0' ), ( 'callee', '@__cxa_atexit' )
  ]),
  OrderedDict([
    ( 'caller', '@function_800' ), ( 'callee', '@__stack_chk_fail' )
  ]),
  OrderedDict([
    ( 'caller', '@JNI_OnLoad' ), ( 'callee', '@pthread_create' )
  ]),
  OrderedDict([
    ( 'caller', '@JNI_OnLoad' ), ( 'callee', '@__stack_chk_fail' )
  ])
]
```

FIG. 7

```
[
    ( 'Risk', 'Level 3(Critical)' ),
    ( 'Leak Data', 'enc.key' ),
    ( 'Leak Point', 'Lcom/product/CoreClass;->exploit()' ),
    ( 'Code Number', 8 )
]
```

METHOD FOR EVALUATING RISK OF DATA LEAKAGE IN APPLICATION, RECORDING MEDIUM AND DEVICE FOR PERFORMING THE METHOD

TECHNICAL FIELD

This disclosure relates to a method for evaluating the risk of data leakage in an application, and a recording medium and a device for performing the method, and more particularly, to a technology for integrally extracting bytecode and native code logic flow to analyze data flow of a mobile application using a static analysis technique

BACKGROUND ART

In an android mobile device, important information such as device information or user personalization information may be mostly collected from framework codes provided by a manufacturer. Malicious codes may hijack such information by adding complex data flows that make it difficult to analyze such information.

In addition, even in a general application, it is necessary to identify a point where important information in the application is leaked by analyzing the data flow. The analysis for identifying the point is usually referred to as data flow analysis.

The software analysis method is largely classified into two methods, namely a static analysis method and a dynamic analysis method. The main difference between the two techniques is whether or not an application is run. The static analysis method is a method of analyzing through information that can be extracted from a file without executing an application. Meanwhile, the dynamic analysis method is a method of analyzing to obtain the desired information by executing an application in an execution environment that satisfies conditions.

However, compared to the static analysis, the dynamic analysis has limitations in collecting overall flow and information. Meanwhile, the existing static analysis method has a limitation in that only a part of the mobile application can be analyzed. Due to the limitation, only DEX files are supported, or analysis is performed only with ELF files of a shared object type. Therefore, there is a problem in that the interaction between the DEX file and the ELF file cannot be analyzed.

RELATED LITERATURES

Patent Literature (Patent Literature 1) KR 10-1623096 B1
(Patent Literature 2) KR 10-1872104 B1
(Patent Literature 3) KR 10-1926142 B1

DISCLOSURE

Technical Problem

Therefore, the technical object of the present disclosure is conceived in this respect, and the present disclosure is directed to providing a method for evaluating the risk of data leakage in an application.

Another object of the present disclosure is to provide a recording medium in which a computer program for performing the method for evaluating the risk of data leakage in an application is recorded.

Still another purpose of the present disclosure is to provide a device for performing the method for evaluating the risk of data leakage in an application.

Technical Solution

In order to accomplish the above object of the present disclosure, a method for evaluating the risk of data leakage in an application according to an embodiment comprises: extracting a DEX (Dalvik Executable) file and a so (Shared Object) file by decompressing an APK file of a mobile application; extracting DEX code information from the DEX file by parsing the DEX file; translating a content of the so file into IR (Intermediate Representation); extracting IR code information from the translated IR; generating a call-reference structure between the DEX file and the so file by processing the extracted DEX code information and the extracted IR code information; and outputting weakness information according to a risk designated in advance based on the generated call-reference structure.

In an embodiment of the present disclosure, the step of generating a call-reference structure between the DEX file and the so file by processing may extract a call between the DEX file and the so file by using a JNI (Java Native Interface).

In an embodiment of the present disclosure, the step of extracting DEX code information may extract at least one information among a class, a method, an access modifier, a byte code, a smali code and a java source code.

In an embodiment of the present disclosure, the step of extracting IR code information may extract at least one information among a function, a return format, a factor and an IR code from the translated IR.

In an embodiment of the present disclosure, the step of generating a call-reference structure between the DEX file and the so file may repeatedly perform a process of finding a called target, when a code of calling another method or function exists in the extracted DEX code and IR code.

In an embodiment of the present disclosure, the step of outputting weakness information may include: comparing a list of specific functions and methods classified according to risks with the generated call-reference structure to inspect whether the corresponding function exists; generating all tracking and reachable paths, when the corresponding function exists in the generated call-reference structure; searching whether a point moving to an I/O (Input/Output, L) of a system exists; producing weakness information according to a risk designated in advance, when the point moving to the I/O exists; and documenting and outputting the weakness information as a final output according to a standard format.

In order to accomplish another object of the present disclosure, there is provided a computer-readable storage medium, in which a computer program for performing the method for evaluating the risk of data leakage in an application is recorded.

In order to accomplish still another object of the present disclosure, a device for evaluating the risk of data leakage in an application according to an embodiment comprises: a file extracting unit configured to extract a DEX (Dalvik Executable) file and a so (Shared Object) file by decompressing an APK file of a mobile application; a DEX parsing unit configured to extract DEX code information from the DEX file by parsing the DEX file; an ELF translating unit configured to translate a content of the so file into IR (Intermediate Representation); an IR parsing unit configured to extract IR code information from the translated IR; a call-reference structure generating unit configured to generate a call-reference structure between the DEX file and the so file by processing the extracted DEX code information and the extracted IR code information; and a risk analyzing unit configured to output weakness information according to a risk designated in advance based on the generated call-reference structure.

In an embodiment of the present disclosure, the call-reference structure generating unit may extract a call between the DEX file and the so file by using a JNI (Java Native Interface).

In an embodiment of the present disclosure, the DEX parsing unit may extract at least one information among a class, a method, an access modifier, a byte code, a smali code and a java source code, and the IR parsing unit may extract at least one information among a function, a return format, a factor and an IR code from the translated IR.

In an embodiment of the present disclosure, the call-reference structure generating unit may repeatedly perform a process of finding a called target, when a code of calling another method or function exists in the extracted DEX code and IR code.

In an embodiment of the present disclosure, the risk analyzing unit may include: an inspecting unit configured to compare a list of specific functions and methods classified according to risks with the generated call-reference structure to inspect whether the corresponding function exists; a path generating unit configured to generate all tracking and reachable paths, when the corresponding function exists in the generated call-reference structure; a loss searching unit configured to search whether a point moving to an I/O (Input/Output, L) of a system exists; an information generating unit configured to produce weakness information according to a risk designated in advance, when the point moving to the I/O exists; and an output unit configured to document and output the weakness information as a final output according to a standard format.

Advantageous Effects

According to this method for evaluating the risk of data leakage in an application, it is possible to extend the call-reference coverage of an android application by generating not only the DEX file but also the so file in a single call-reference structure bundle. In particular, it is possible to analyze the interaction between the DEX file and the ELF file, namely the so file, through JNI call or the like.

In addition, the present disclosure is effective in increasing productivity by reducing the amount of maintenance because it is possible to notify the risk and leakage point according to important data. Therefore, the present disclosure may be provided as a useful tool that can help an application manager or developer to develop applications with enhanced security.

DESCRIPTION OF DRAWINGS

FIG. 2 is a diagram showing an example of an information format extracted by a DEX parsing unit of FIG. 1.

FIG. 3 is a diagram showing an example of an information format extracted by an IR parsing unit of FIG. 1.

FIG. 4 is a diagram showing an example of an information format extracted by a call-reference structure generating unit of FIG. 1.

FIG. 7 is a diagram showing an example of a final output format output by the risk analyzing unit of FIG. 1.

BEST MODE

Figure 1:
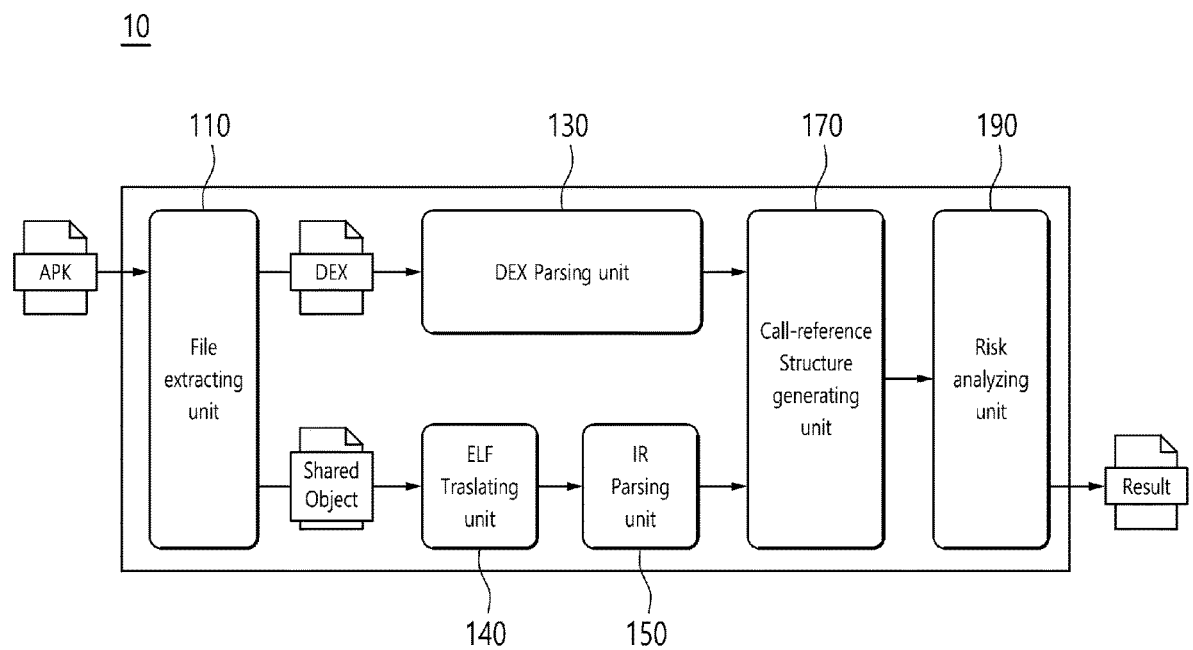
FIG. 1 is a block diagram showing a device for evaluating the risk of data leakage in an application according to an embodiment of the present disclosure.

The following detailed description of the present disclosure refer to the accompanying drawings that exemplarily illustrate specific embodiments in which the present disclosure may be implemented. These embodiments are described in sufficient detail to enable a person skilled in the art to practice the present disclosure. It should be understood that various embodiments of the present disclosure are different but need not be exclusive from each other. For example, specific shapes, structures and characteristics described herein may be implemented in other embodiments without departing from the idea and scope of the present disclosure in relation to one embodiment. In addition, it should be understood that locations or arrangement of individual components in each disclosed embodiment may be changed without departing from the idea and scope of the present disclosure. Accordingly, the following description is not intended to limit the scope, and the scope of the present disclosure, if properly described, is limited only by the appended claims, along with all scopes equivalent to the features defined in the claims. Like reference numerals in the drawings indicate the same or similar functions over several aspects.

Hereinafter, preferred embodiments of the present disclosure will be described in more detail with reference to the drawings.

FIG. 1 is a block diagram showing a device for evaluating the risk of data leakage in an application according to an embodiment of the present disclosure.

The device 10 for evaluating the risk of data leakage in an application (hereinafter, the device) according to the present disclosure derives an output by using a DEX file and a so file in order to evaluate the risk of data leakage in an application.

Referring to FIG. 1, the device 10 according to the present disclosure includes a file extracting unit 110, a DEX parsing unit 130, an ELF translating unit 140, an IR parsing unit 150, a call-reference structure generating unit 170, and a risk analyzing unit 190.

In the device 10 of the present disclosure, software (application) may be installed and executed to evaluate the risk of data leakage in an application. Also, the file extracting unit 110, the DEX parsing unit 130, the ELF translating unit 140, the IR parsing unit 150, the call-reference structure generating unit 170 and the risk analyzing unit 190 may be controlled by the software for evaluating the risk of data leakage in the application executed in the device 10.

The device 10 may be a separate terminal or some modules of a terminal. In addition, the file extracting unit 110, the DEX parsing unit 130, the ELF translating unit 140, the IR parsing unit 150, the call-reference structure generating unit 170 and the risk analyzing unit 190 may be formed as an integrated module, or one or more modules. However, on the contrary, each component may also be formed as a separate module.

The device 10 may be mobile or fixed. The device 10 may be in the form of a server or an engine, and may be referred to as another term such as a device, an apparatus, a terminal, a user equipment (UE), a mobile station (MS), a wireless device or a handheld device.

In the present disclosure, the data flow is analyzed in a form corresponding to a static analysis method. Also, the present disclosure may be applied to a mobile application. If APK is put as an input, a point where important information may be leaked and the risk are calculated as a result.

The important information may be an encryption key or a signing key used by the application, or a seed value of a random number generator, for example. In addition, depending on whether this information is generated by calculation at runtime (during execution), a pure value to be entered by a user, or a value predefined in the application, the risk may be set sequentially higher.

The file extracting unit 110 extracts a DEX (Dalvik Executable) file and a so (Shared Object) file by decompressing an APK file of a mobile application.

Since the APK file may be treated as a zip file, it is decompressed using an Unzip tool or the like to search and collect necessary data such as Dalvik Executable (.dex) and Shared Object (.so) files.

The mobile application is distributed in the form of an APK (Android Application Package) file. APK includes one or more DEX (Dalvik Executable) files and additional resource files. Some of the additional resource files correspond to a so (Shared Object) file. The so file is a file for supporting a JNI (JAVA Native Interface) to use various functions subordinate to an operating system, and is generally compiled in C or C++ language. In the present disclosure, the output is derived using the DEX file and the so file.

The DEX parsing unit 130 extracts DEX code information from the DEX file by parsing the DEX file.

The DEX parsing unit 130 may extract a class, a method, an access modifier, a bytecode, a smali code, a java sourcecode information, or the like by parsing the DEX file. An example of the extracted DEX code information format is shown in FIG. 2. The bytecode is used as a code to run an android application, and the smali code is a language that expresses the bytecode so as to be read by humans.

The ELF translating unit 140 translates a content of the so file into IR (Intermediate Representation).

This is because the so file is composed in an ELF (Executable and Linkable Format) file format and the so file is required to be translated into IR in order to facilitate extraction of necessary information. Since the ELF file corresponds to machine code, it may be expressed in assembly language corresponding thereto.

However, since the ELF file is subordinate to a CPU Architecture of the execution machine (e.g.: x86, x86-64, Amd64, Armeabi-v7a, Arm64-v8a, MIPS, etc.), it is difficult to extract the desired information. Therefore, there is a need to translate assembly language into IR. Compared to assembly language, the IR has an advantage in that it has less subordinate to the CPU Architecture and is a human-readable language, which allows easier parsing.

The IR parsing unit 150 extracts IR code information from the translated IR.

The IR parsing unit 150 may extract a function, a return format, a factor and an IR code information from the converted IR. An example of the extracted IR code information format is shown in FIG. 3. For example, if the line "define i32 @main (void (i64*)* %func, i64* %arg, i64 %dso _handle) local_unnamed_addr {" is found in the IR, this is identified as a function declaration by means of the first token 'define'. The next token 'i32' becomes the returnType of the function. '@main' becomes the name of the function, the contents in the following parentheses are distinguished by ',' (comma). Also, based on the space criterion, the front is extracted as a function factor format (void (i64*)*) and the rear is extracted as the name (func), respectively.

The call-reference structure generating unit 170 generates a call-reference structure between the DEX file and the so file by processing the extracted DEX code information and the extracted IR code information.

The call-reference structure generating unit 170 generates a call-reference structure between the method and the function, and processes the output generated through the DEX parsing unit 130 and the IR parsing unit 150. An example of the extracted call-reference structure information format is shown in FIG. 4.

If there is a code that calls another method or function in the code, the call-reference structure generating unit 170 finds a target to be called. By repeating the above process, a call-reference structure corresponding to the entire application is generated.

In addition, in the present disclosure, the call between the DEX file and the so file may use a JNI (Java Native Interface). Therefore, the process of additionally finding a JNI call-reference structure such as System.loadLibrary and JNI_OnLoad method is proceeded. Through this, it is possible to extend the call-reference coverage of the android application.

Figure 5:
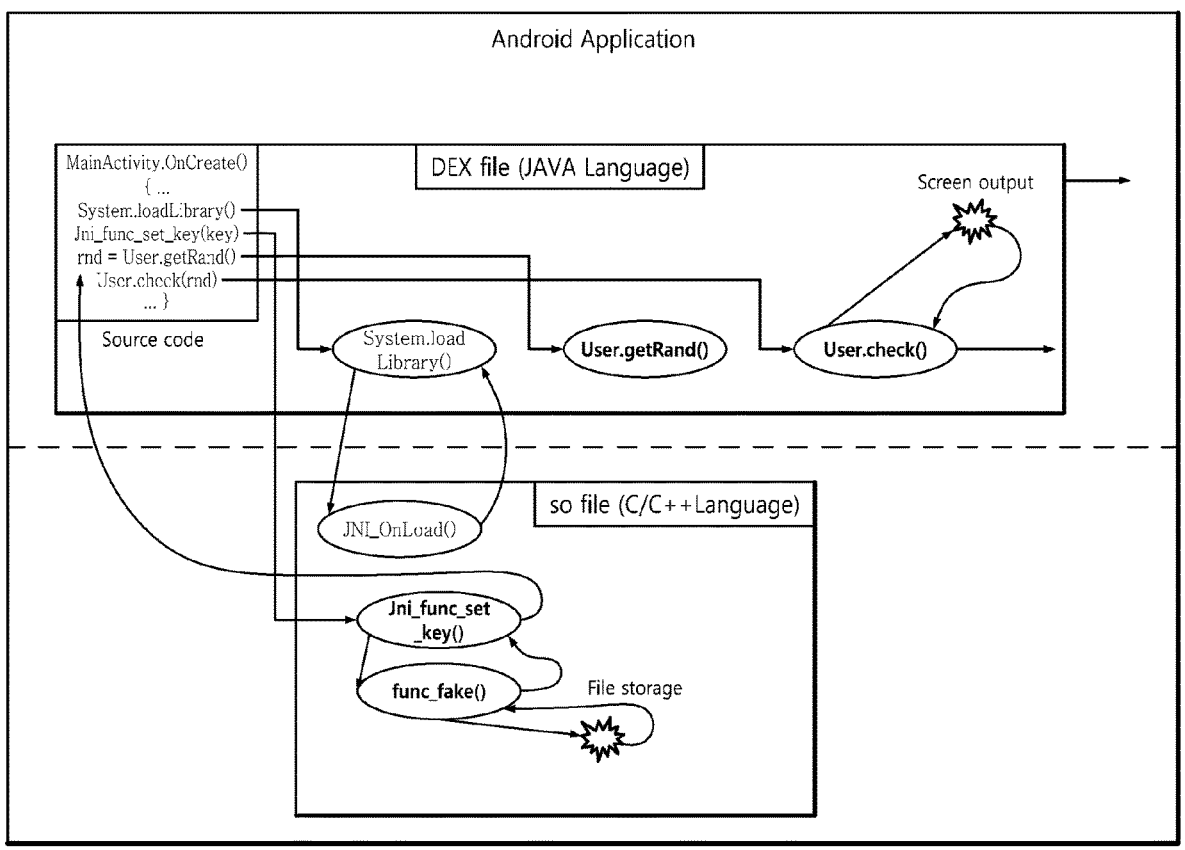
FIG. 5 is a diagram showing a code in the DEX file and a code call-reference structure in the so file according to the present disclosure.
Figure 6:
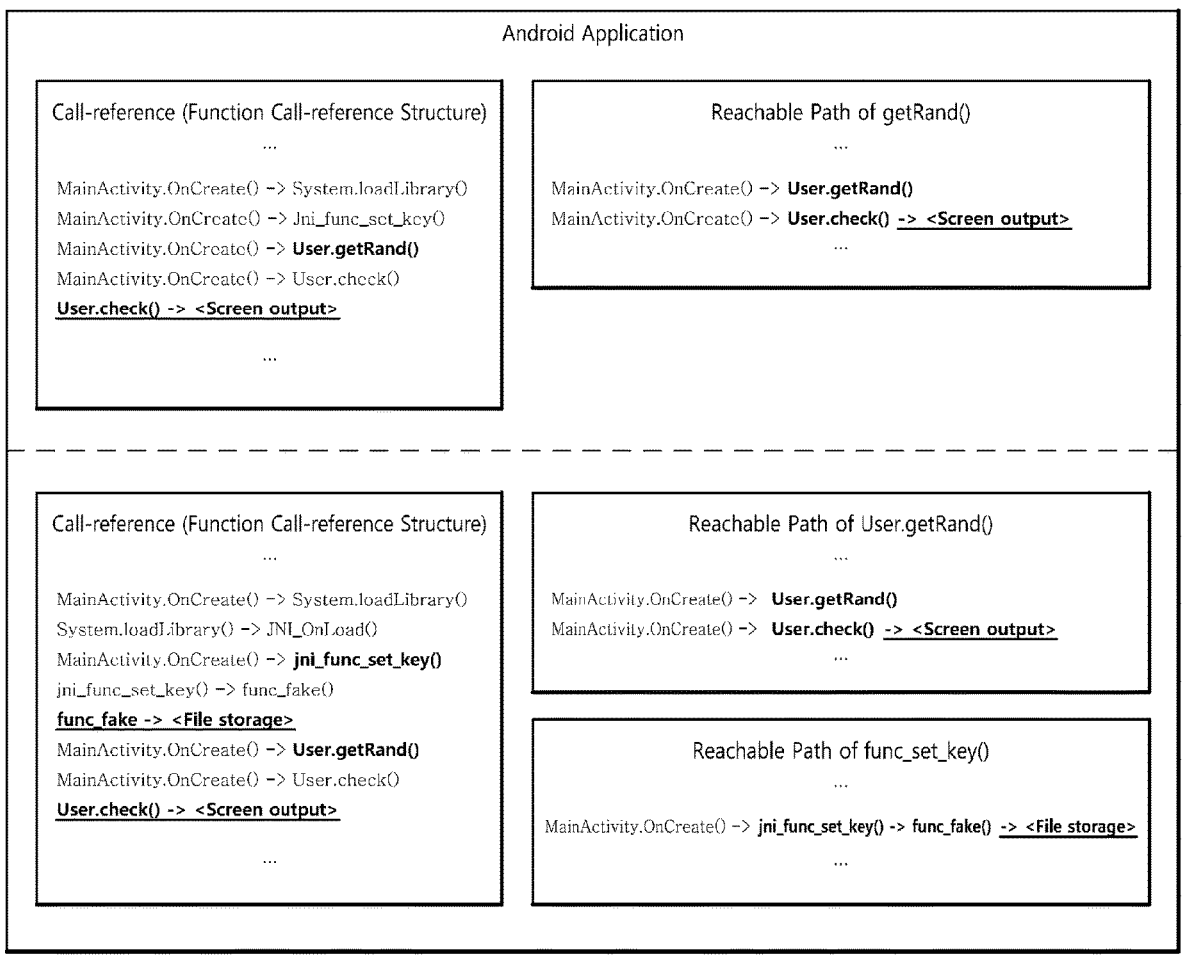
FIG. 6 is a diagram showing an example of a call-reference structure and a reaching path according to the present disclosure.

FIG. 5 is an example of the process of executing a code of the so file while executing a code in the DEX file. In FIGS. 5 and 6, the function dealing with important information (seed, key value, etc.) and the function with an I/O operation are indicated in bold.

Referring to FIG. 5, a JNI_OnLoad( ) function in the so file is called through System.loadLibrary( ), and the process returns to a DEX file execution flow after a subroutine in the so file is operated.

In this process, in the prior art, the DEX file or the so file should be analyzed separately, so User.getRand( ) handles important information (rnd), and a path for transmitting important information to User.check( ) is generated through User.check(rnd). In addition, if a path that a screen output (e.g.: System.out.println( )) function is generated in User.check( ) and important information is sent out through I/O can be created, the path is detected.

FIG. 6 is an example of a path that a function reaches. Referring to FIG. 6, the prior art has a problem in that jni_func_set_key( ) extracts important information from the DEX file code but does not detect when the leaked (outgoing through the I/O) path is in the so file code.

Meanwhile, the call-reference structure generated in the present disclosure can solve the problem of the prior art since the call-reference structure between the DEX and the so file may be figured out.

The present disclosure also holds a code inside the function including the call-reference structure, and this characteristic may solve the case where the call-reference structure is not revealed by using only data reference. In other words, the present disclosure has an advantage in that it is possible to analyze not only the call-reference structure (DEX, DEX ↔ so, so) but also the internal code of the function.

The risk analyzing unit 190 outputs weakness information according to a risk designated in advance based on the generated call-reference structure.

The risk analyzing unit 190 compares a list of specific functions and methods (V, V={$v_0, v_1, \ldots, v_n$}) classified according to risks with the call-reference structure (C) and inspects whether a corresponding function exists. V includes a function or the like that accesses data considered as important information in the target application. If the function ($v_i$) exists within (C), all paths ($v_i \in C$) that can be tracked and reached are generated.

It is searched whether a point moving to System I/O (Input/Output, L, L={$l_0, l_1, \ldots, l_n$}) exists ($L_k \in P_i$). If the point exists, weakness information is produced according to the risk specified in advance.

After that, a final output is produced by documenting the weakness information according to a standard format. The information contained in the output may include a point at which the important information is movable to screen output, file output, or the like through I/O, and the degree of risk. An example of the final output format is shown in FIG. 7.

In an embodiment, the possibility of reaching a specific point on a graph may be analyzed by calculating whether the important information is reachable a function that goes out to the I/O (screen output, file storage, or the like) through the IFDS algorithm.

The present disclosure may make up for the loopholes of the existing technology. This is because not only the DEX file but also the so file are generated as a single call-reference structure bundle. This makes it possible to solve the problem of the existing technology in which the interaction between the DEX file and the ELF file, namely the so file, cannot be analyzed.

Figure 8:
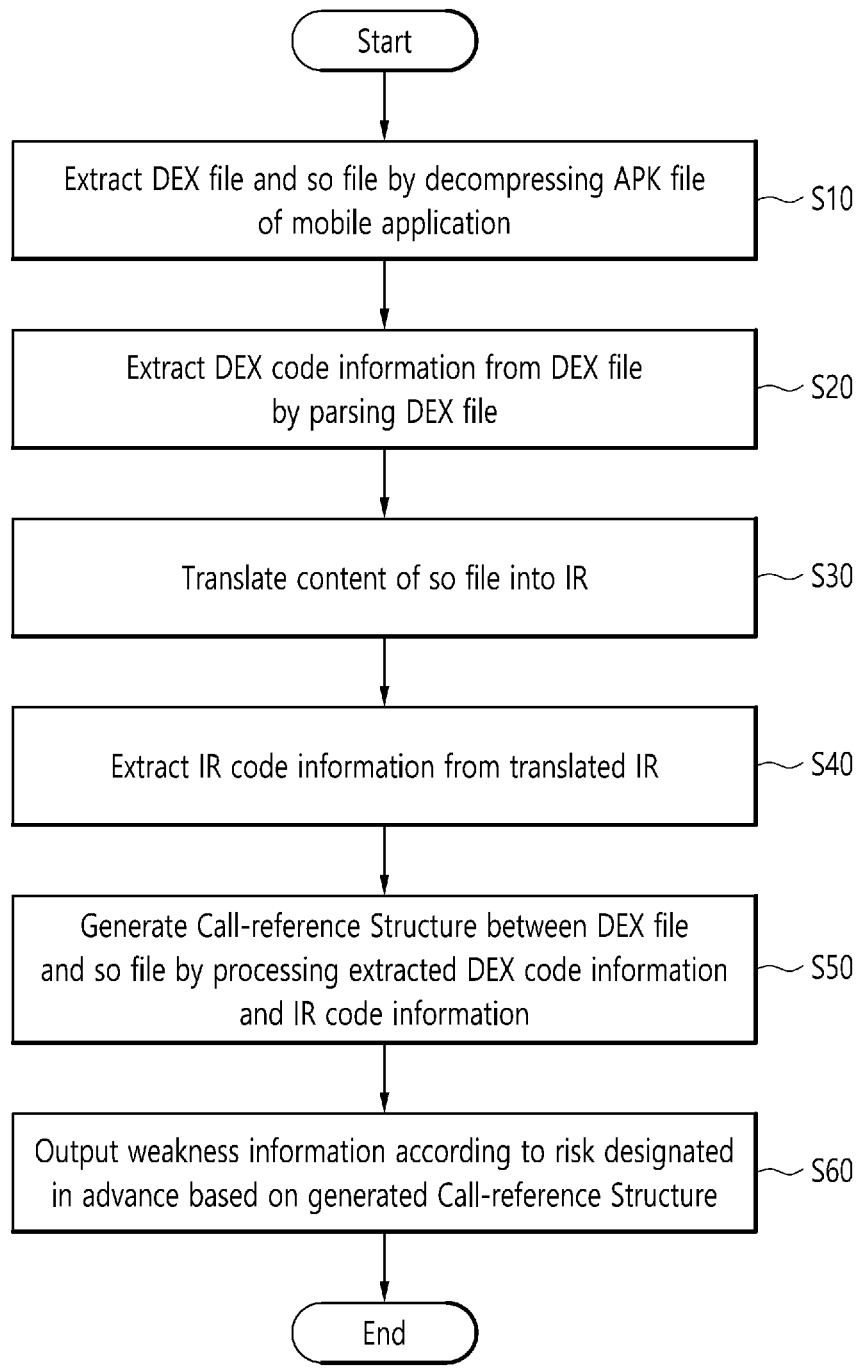
FIG. 8 is a flowchart for illustrating a method for evaluating the risk of data leakage in an application according to an embodiment of the present disclosure.

FIG. 8 is a flowchart for illustrating a method for evaluating the risk of data leakage in an application according to an embodiment of the present disclosure.

The method for evaluating the risk of data leakage in an application according to this embodiment may be performed in substantially the same configuration as the device 10 of FIG. 1. Accordingly, the same components as in the device 10 of FIG. 1 are endowed with the same reference signs and will not be described again.

In addition, the method for evaluating the risk of data leakage in an application according to this embodiment may be executed by software (application) for evaluating the risk of data leakage in the application.

The method for evaluating the risk of data leakage in an application according to the present disclosure derives an output by using a DEX file and a so file in order to evaluate the risk of data leakage in the application.

In the present disclosure, the data flow is analyzed in a form corresponding to a static analysis method. Also, the present disclosure may be applied to a mobile application. If APK is put as an input, a point where important information may be leaked and the risk are calculated as a result.

The important information may be an encryption key or a signing key used by the application, or a seed value of a random number generator, for example. In addition, depending on whether this information is generated by calculation at runtime (during execution), a pure value to be entered by a user, or a value predefined in the application, the risk may be set sequentially higher.

Referring to 8, in the method for evaluating the risk of data leakage in an application according to this embodiment, a DEX (Dalvik Executable) file and a so (Shared Object) file are extracted by decompressing an APK file of a mobile application (S10).

Since the APK file may be treated as a zip file, it is decompressed using an Unzip tool or the like to search and collect necessary data such as Dalvik Executable (.dex) and Shared Object (.so) files.

The mobile application is distributed in the form of an APK (Android Application Package) file. APK includes one or more DEX (Dalvik Executable) files and additional resource files. Some of the additional resource files correspond to a so (Shared Object) file. The so file is a file for supporting a JNI (JAVA Native Interface) to use various functions subordinate to an operating system, and is generally compiled in C or C++ language. In the present disclosure, the output is derived using the DEX file and the so file.

DEX code information is extracted from the DEX file by parsing the DEX file (S20).

The extracted DEX code information may be a class, a method, an access modifier, a bytecode, a smali code, a java sourcecode information, or the like. The bytecode is used as a code to run an android application, and the smali code is a language that expresses the bytecode so as to be read by humans.

A content of the so file is translated into IR (Intermediate Representation) (S30).

This is because the so file is composed in an ELF (Executable and Linkable Format) file format and the so file is required to be translated into IR in order to facilitate extraction of necessary information. Since the ELF file corresponds to machine code, it may be expressed in assembly language corresponding thereto.

However, since the ELF file is subordinate to a CPU Architecture of the execution machine (e.g.: x86, x86-64, Amd64, Armeabi-v7a, Arm64-v8a, MIPS, etc.), it is difficult to extract the desired information. Therefore, there is a need to translate assembly language into IR. Compared to assembly language, the IR has an advantage in that it has less subordinate to the CPU Architecture and is a human-readable language, which allows easier parsing.

IR code information is extracted from the translated IR (S40).

The extracted IR code information may be a function, a return format, a factor and an IR code information. For example, if the line "define i32 @main (void (i64*)* %func, i64* %arg, i64 %dso_handle) local_unnamed_addr {" is found in the IR, this is identified as a function declaration by means of the first token 'define'. The next token 'i32' becomes the returnType of the function. '@main' becomes the name of the function, the contents in the following parentheses are distinguished by ',' (comma). Also, based on the space criterion, the front is extracted as a function factor format (void (i64*)*) and the rear is extracted as the name (func), respectively.

A call-reference structure between the DEX file and the so file is generated by processing the extracted DEX code information and the extracted IR code information (S50).

In an embodiment, a call between the DEX file and the so file may be extracted using an JNI (Java Native Interface). If there is a code that calls another method or function from the extracted DEX code and IR code, the entire call-reference structure of the application may be generated by repeating the process of finding a called target.

In the present disclosure, the call between the DEX file and the so file may use a JNI (Java Native Interface). Therefore, the process of additionally finding a JNI call-reference structure such as System.loadLibrary and JNI_On-Load method is proceeded. Through this, it is possible to extend the call-reference coverage of the android application.

The present disclosure also holds a code inside the function including the call-reference structure, and this characteristic may solve the case where the call-reference structure is not revealed by using only data reference. In other words, the present disclosure has an advantage in that it is possible to analyze not only the call-reference structure (DEX, DEX ↔ so, so) but also the internal code of the function.

Weakness information is output according to a risk designated in advance based on the generated call-reference structure (S60).

In the step of outputting weakness information (S60), a list of specific functions and methods classified according to risks is compared with the generated call-reference structure to inspect whether a corresponding function exists. If a function corresponding to the generated call-reference structure exists, all paths that can be tracked and reached are generated.

After that, it is searched whether a point moving to the I/O of the system exists, and if the point exists, weakness information is produced according to the risk specified in advance.

Finally, a final output may be output by documenting the weakness information according to a standard format. The information contained in the output may include a point at which the important information is movable to screen output, file output, or the like through I/O, and the degree of risk.

In the present disclosure, it is possible to extend the call-reference coverage of an android application by generating not only the DEX file but also the so file in a single call-reference structure bundle. In particular, it is possible to analyze the interaction between the DEX file and the ELF file, namely the so file, through JNI call or the like.

In addition, the present disclosure is effective in increasing productivity by reducing the amount of maintenance because it is possible to notify the risk and leakage point according to important data. Therefore, the present disclosure may be provided as a useful tool that can help an application manager or developer to develop applications with enhanced security.

The method for evaluating the risk of data leakage in an application as described above may be implemented as an application or in the form of program commands that may be executed through various computer components, and may be recorded in a computer-readable recording medium. The computer-readable recording medium may include a program command, a data file, a data structure, or the like alone or in combination.

The program commands recorded in the computer-readable recording medium may be specially designed and constructed for the present disclosure and may be already known to and usable by those skilled in the computer software field.

Examples of the computer-readable recording medium include magnetic media such as hard disks, floppy disks and magnetic tapes, optical recording media such as CD-ROMs and DVDs, magnetic-optical media such as floptical disks, and hardware devices specially configured to store and execute program commands such as ROM, RAM and flash memories.

Examples of the program command include not only machine language codes produced by a compiler but also high-level language codes that may be executed by a computer using an interpreter or the like. The hardware device may be configured to operate as one or more software modules to perform the processing according to the present disclosure, or vice versa.

Although the present disclosure has been described with reference to embodiments, it would be understood that various modifications and changes can be made by those skilled in the art from the present disclosure without departing from the idea and scope defined in the appended claims.

INDUSTRIAL APPLICABILITY

The present disclosure may solve the problem of the existing technology that cannot analyze the interaction between the DEX file and the ELF file, namely the so file, through JNI call or the like. Accordingly, the present disclosure is expected to help an application manager or developer to develop applications with enhanced security.

REFERENCE SIGNS

10: device for evaluating the risk of data leakage in an application
110: file extracting unit
130: DEX parsing unit
140: ELF translating unit
150: IR parsing unit
170: call-reference structure generating unit
190: risk analyzing unit

The invention claimed is:
1. A method for evaluating a risk of data leakage in a mobile application, the method comprising:
   extracting a DEX (Dalvik Executable) file and a so (Shared Object) file by decompressing an APK file of the mobile application;
   extracting DEX code information from the DEX file by parsing the DEX file;
   translating a content of the so file into IR (Intermediate Representation);
   extracting IR code information from the translated IR;
   generating a call-reference structure between the DEX file and the so file by processing the extracted DEX code information and the extracted IR code information; and
   outputting weakness information according to a risk designated in advance based on the generated call-reference structure,
   wherein the outputting the weakness information comprises:
   comparing a list of specific functions and methods classified according to risks with the generated call-reference structure to inspect whether a corresponding function exists;
   when the corresponding function exists in the generated call-reference structure, tracking and generating all reachable paths;
   searching whether a point moving to an I/O (Input/Output, L) of a system exists;
   when the point moving to the I/O exists, producing the weakness information according to the risk designated in advance; and
   documenting the weakness information according to a standard format and outputting the documented weakness information as a final output.
2. The method of claim 1, wherein the generating the call-reference structure between the DEX file and the so file comprises extracting a call between the DEX file and the so file by using a JNI (Java Native Interface).

3. The method of claim 1, wherein the extracting the DEX code information comprises extracting at least one information among a class, a method, an access modifier, a byte code, a smali code, and a java source code.

4. The method of claim 1, wherein the extracting the IR code information comprises extracting from the translated IR at least one information among a function, a return format, a factor, and an IR code.

5. The method of claim 1, wherein the generating the call-reference structure between the DEX file and the so file comprises when a code for calling another method or function exists in the extracted DEX code information and the extracted IR code information, repeatedly performing a process of finding a called target.

6. A non-transitory computer-readable storage medium, in which a computer program for performing a method for evaluating a risk of data leakage in a mobile application is recorded, wherein the method comprises:
   extracting a DEX (Dalvik Executable) file and a so (Shared Object) file by decompressing an APK file of the mobile application;
   extracting DEX code information from the DEX file by parsing the DEX file;
   translating a content of the so file into IR (Intermediate Representation);
   extracting IR code information from the translated IR;
   generating a call-reference structure between the DEX file and the so file by processing the extracted DEX code information and the extracted IR code information; and
   outputting weakness information according to a risk designated in advance based on the generated call-reference structure,
   wherein the outputting the weakness information comprises:
   comparing a list of specific functions and methods classified according to risks with the generated call-reference structure to inspect whether a corresponding function exists;
   when the corresponding function exists in the generated call-reference structure, tracking and generating all reachable paths;
   searching whether a point moving to an I/O (Input/Output, L) of a system exists;
   when the point moving to the I/O exists, producing the weakness information according to the risk designated in advance; and
   documenting the weakness information according to a standard format and outputting the documented weakness information as a final output.

7. A device for evaluating a risk of data leakage in a mobile application, the device comprising:
   a file extracting unit configured to extract a DEX (Dalvik Executable) file and a so (Shared Object) file by decompressing an APK file of the mobile application;
   a DEX parsing unit configured to extract DEX code information from the DEX file by parsing the DEX file;
   an ELF translating unit configured to translate a content of the so file into IR (Intermediate Representation);
   an IR parsing unit configured to extract IR code information from the translated IR;
   a call-reference structure generating unit configured to generate a call-reference structure between the DEX file and the so file by processing the extracted DEX code information and the extracted IR code information; and
   a risk analyzing unit configured to output weakness information according to a risk designated in advance based on the generated call-reference structure,
   wherein the risk analyzing unit comprises:
   an inspecting unit configured to compare a list of specific functions and methods classified according to risks with the generated call-reference structure to inspect whether a corresponding function exists;
   a path generating unit configured to track and generate all reachable paths, when the corresponding function exists in the generated call-reference structure;
   a loss searching unit configured to search whether a point moving to an I/O (Input/Output, L) of a system exists;
   an information generating unit configured to produce the weakness information according to the risk designated in advance, when the point moving to the I/O exists; and
   an output unit configured to document the weakness information according to a standard format and output the documented weakness information as a final output.

8. The device of claim 7, wherein the call-reference structure generating unit is further configured to extract a call between the DEX file and the so file by using a JNI (Java Native Interface).

9. The device of claim 7, wherein the DEX parsing unit is further configured to extract at least one information among a class, a method, an access modifier, a byte code, a smali code, and a java source code, and
   wherein the IR parsing unit is further configured to extract from the translated IR at least one information among a function, a return format, a factor, and an IR code.

10. The device of claim 7, wherein the call-reference structure generating unit is further configured to repeatedly perform a process of finding a called target, when a code for calling another method or function exists in the extracted DEX code information and the extracted IR code information.

* * * * *